United States Patent [19]

Neil et al.

[11] Patent Number: 4,809,281
[45] Date of Patent: Feb. 28, 1989

[54] FREE-ELECTRON LASER

[75] Inventors: George R. Neil, San Pedro; John A. Edighoffer, Palo Alto, both of Calif.

[73] Assignee: TRW Inc., Redondo Beach, Calif.

[21] Appl. No.: 752,286

[22] Filed: Jul. 5, 1985

[51] Int. Cl.$^4$ .............................................. H01S 3/00
[52] U.S. Cl. ........................................ 372/2; 372/21; 372/22; 372/74; 372/99
[58] Field of Search .................... 372/2, 99, 21, 22, 74

[56] References Cited

U.S. PATENT DOCUMENTS 3,648,193  3/1972  Foster et al. .......................... 372/22
4,189,686  2/1980  Brau et al. ............................ 372/74

Primary Examiner—William L. Sikes
Assistant Examiner—Georgia Y. Epps
Attorney, Agent, or Firm—Noel F. Heal; Sol L. Goldstein

[57] ABSTRACT

A free-electron laser capable of operation at a shorter wavelength than the fundamental lasing wavelength, but without any increase in electron energy requirements. The laser includes a conventional high-energy electron beam source and a wiggler transverse magnetic field through which the beam is passed to produce lasing. Opposed optical mirrors are selected to be reflective at a selected harmonic wavelength as well as at the fundamental wavelength. Lasing is initiated at the fundamental wavelength, but is then supported at the selected harmonic wavelength as well. By appropriate design lasing at the fundamental wavelength may be subsequently terminated without affecting lasing at the harmonic wavelength, which continues at a substantially reduced energy cost than would have been incurred if lasing at the harmonic frequency been initiated in a fundamental mode.

9 Claims, 1 Drawing Sheet

FREE-ELECTRON LASER

BACKGROUND OF THE INVENTION

This invention relates generally to relatively high-power lasers and, more particularly, to lasers of the free-electron type. In contrast to other laser types in which electrons may be bound to a single atom or molecule, or in which electrons may be free to move through the entire volume of semiconductor, the free-electron laser produces stimulated emission from a beam of free electrons in a vacuum.

Basically, in a free-electron laser, a beam of relativistic electrons, that is, electrons that have been accelerated to speeds comparable with the speed of light, is passed through a transverse and periodic magnetic field, known as a "wiggler," which results in periodic transverse movement of the electrons. Light is emitted in the direction of the electron beam as a result of the interaction between the electrons and the magnetic field, and is fed back through the wiggler by means of two opposed mirrors. Stimulated emission comes about through the interaction of the electromagnetic wave fed back and forth and the periodic magnetic structure.

An important property of the free-electron laser is that it is frequency-tunable over a relatively wide range. The wavelength $\lambda$ of light emission from the laser is directly proportional to the wavelength of the periodic magnetic wiggler field, and is inversely proportional to the square of $\gamma$, which is a measure of electron energy. The quantity $\gamma$ is the electron energy expressed as a multiple of the "at rest" energy of the electron. An electron at rest has a $\gamma$ value of unity, equivalent to the energy it possesses solely as a result of its mass. As the velocity of the electron is increased, its total energy increases, and may be usefully expressed in terms of its $\gamma$ value.

The velocity, v, of an electron may be expressed as a fraction, B of the speed of light, c, as follows:

$$\beta = v/c = 1 - 1/\gamma^2$$

as the energy of the electron increases, indicated by larger values of $\gamma$, the speed approaches, but never reaches the speed of light.

In one experiment using a free-electron laser, an output wavelength of 10 microns (micrometers) was achieved with a wiggler wavelength of 3.5 cm and an energy of 25 Mev (million electron volts) to accelerate the electron beam. To obtain an optical output wavelength of 1.6 microns, an accelerating energy of 66 Mev had to be used, and to obtain an output wavelength of 0.5 micron, the accelerating energy level had to be raised to 117 Mev. In general to obtain a decrease in wavelength by a given factor, the energy must be increased by approximately the square root of that factor.

Therefore, shorter wavelengths can be obtained from a free-electron laser only at the expense of increased electron energy. Since free-electron lasers operate at relatively low efficiency levels and require expensive linear accelerators to produce the electron beam, it is often difficult to achieve laser oscillator action, which requires sufficient gain to exceed the losses in the optical cavity of the system. There is clearly a need for a free-electron laser that will require less accelerating energy for a given frequency, and the present invention is directed to this need.

SUMMARY OF THE INVENTION

The present invention resides in a free-electron laser, and a related method for its use, in which the electron-accelerating energy requirement is substantially reduced for a given wavelength of the optical output. Briefly, the free-electron laser of the invention includes all of the elements of a conventional free-electron laser, with the exception that it has mirrors selected to be highly reflective at both a fundamental frequency and at a selected harmonic frequency, that is to say at a multiple of the fundamental.

The lasing action in a free-electron laser brings about a spatial bunching of electrons in the beam. In effect, the electrons are density-modulated as they pass through the periodic magnetic field. The wavelength of this modulation is equal to the fundamental optical lasing wavelength. As it happens, this density modulation of the electrons is not purely sinusoidal and includes harmonic components. Therefore, the gain at harmonic frequencies increased, and it is more readily possible to achieve laser oscillation at the harmonic wavelengths. If the laser mirrors are selected to be highly reflective to a selected harmonic, lasing will take place at the selected harmonic wavelength. Lasing at this harmonic wavelength is obtained without the usual cost of the higher accelerating energy level associated with the shorter fundamental wavelength. For example, a third-harmonic laser output can be obtained without the usually required increase in energy of about seventy percent, or a factor equal to the square root of three.

In terms of a novel method, the invention comprises the steps of selecting a pair of laser mirrors that are reflective at both a fundamental and a selected harmonic wavelength, initiating operation of the laser at the fundamental wavelength, and then continuing operation at the selected harmonic wavelength, but at an energy level lower than would have been required to initiate lasing at the harmonic wavelength in a conventional manner.

Other aspects and advantages of the invention will become apparent from the following more detailed description, taken in conjunction with the accompanying drawings.

DESCRIPTION OF THE PREFERRED EMBODIMENT

Figure 1:
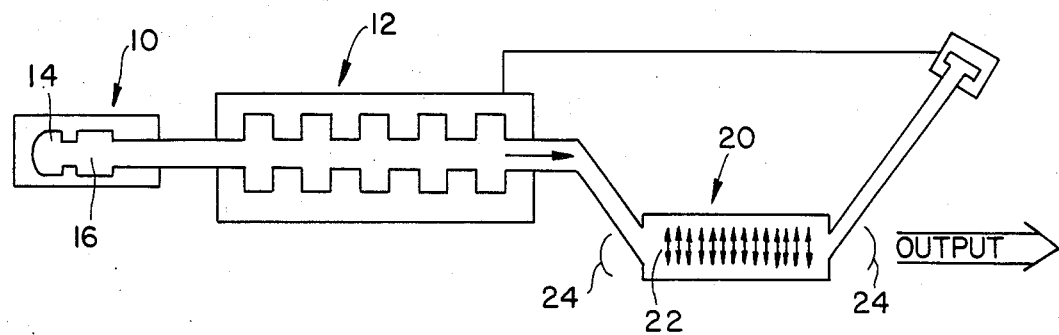
FIG. 1 is a diagrammatic view of a free-electron laser.

As shown in the drawings for purposes of illustration the present invention is concerned with an improved laser of the free-electron type. The free-electron laser requires a high-energy electron beam, which is shown in FIG. 1 as being produced by an electron injector, indicated by reference numeral 10, and an electron accelerator 12. The injector 10 includes and electron gun 14, from which a high voltage, such as 100 kV, accelerates electrons into a subharmonic buncher and a primary buncher 16, which trap electrons in proper phase and accelerate them to a few million electron volts (MeV). The electrons then emerge into an accelerator 16, which comprises a number of microwave radio-frequency (rf) cavities. In the accelerator, the electrons are accelerated to a desired energy level, typically from 10 to 150 MeV.

The resulting electron beam is relatavistic in nature. That is to say, the electrons are moving at speeds comparable with the speed of light. The beam is magnetically deflected into a free-electron laser cavity 20, which basically has only two active components: a transverse, periodic magnetic field generator, shown diagrammatically at 22, and a pair of opposed optical cavity mirrors 24. The periodic magnetic field, known as a "wiggler," moves the electrons transversely with respect to the beam path, and the interaction between the field and the moving electrons results initially in spontaneous emission of light. In a normal environment, this light would be emitted uniformly in all directions, but the relativistic nature of the electrons results in a different effect, namely the emission of a narrow cone of light in a direction practically coincident with that of the electron beam. Repeated reflections of the light between the cavity mirrors 24 results in stimulated emission of light from the laser 20, so long as the lasing gain is sufficient to overcome losses in the cavity.

As explained in the foregoing background section, the wavelength of the emitted light is directly proportional to the wavelength of the magnetic field, and is inversely proportional to the square of the energy of the electron beam, expressed as a factor $\gamma$. Because of inverse relationship between energy and wavelength, greater energies must be employed to achieve shorter wavelengths.

Figure 2:
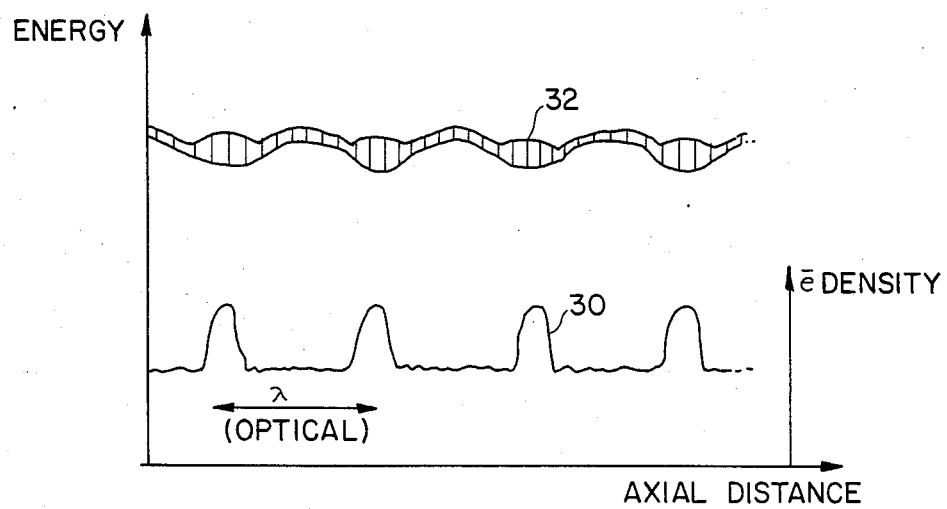
FIG. 2 is a simplified graph showing the variation of electron energy and electron density along the axis of the laser.

In accordance with the invention, the cavity mirrors 24 are selected to be highly reflective at both a fundamental optical wavelength and at a selected harmonic wavelength, that is at a wavelength corresponding to a multiple of the fundamental frequency. Operation of the laser in accordance with the invention depends on a phenomenon of electron bunching that occurs within the wiggler field. Intuitively, it can be reasoned that if the electrons in the magnetic field were uniformly distributed, it would be impossible for emission of energy to occur. It has been theoretically established that there is a density modulation of the electrons within the magnetic field, as shown diagrammatically at 30 in FIG. 2. The density varies periodically, and peaks at locations spaced by the fundamental wavelength. There is also a corresponding energy variation, shown diagrammatically at 32 in FIG. 2, and having the same periodic spacing. It is believed that the periodic density modulation is responsible for the emission action. At least it can be said that the periodic density modulation always accompanies the emission action.

An important aspect of the electron density modulation is that the modulation is not a pure sinusoidal waveform at the fundamental frequency. On the contrary, it is rich in odd harmonic components, especially the third, fifth and seventh harmonics. Accordingly, the electron distribution established for lasing at the fundamental frequency is also capable of supporting lasing at a selected harmonic frequency. In conventional operation of a free-electron laser, these harmonic modes are suppressed by the selection of cavity mirrors that are responsive only at the fundamental frequency. In the present invention, however, the mirrors 24 are deliberately selected to be responsive to both the fundamental frequency and a selected harmonic frequency, such as the third harmonic. Even though it might not be possible to initiate lasing at the third harmonic frequency by itself, it is nevertheless possible to produce lasing at the third harmonic by first initiating lasing at the fundamental frequency.

The cavity mirrors 24 may be a single set of mirrors designed to be reflective at both the fundamental and the selected harmonic frequency, or may be two separate sets of mirrors, one of which is reflective at the fundamental frequency and the other of which is reflective at the selected harmonic frequency. Depending on the specific design of the wiggler, it may be possible to support the harmonic-mode lasing by itself after initiating lasing in the fundamental and the harmonic modes. In other words, in some designs it may be possible to remove the fundamental-mode mirrors and allow the device to continue lasing at the harmonic frequency. This would be possible if the wiggler were of the type known as tapered. In a tapered wiggler, the wiggler gain is relatively low at low frequencies and increases to a peak at a relatively high frequency. Initiation of lasing at the fundamental frequency and continued oscillation at the harmonic frequency permits subsequent termination of fundamental oscillation while leaving the device operating at a relatively high wiggler power and at the harmonic frequency. This is to be contrasted with a so-called constant wiggler, in which the power is relatively constant at low frequencies and falls off at higher frequencies. With this arrangement, the fundamental oscillation probably has to be sustained with the harmonic oscillation, but there is still a benefit in obtaining the harmonic oscillation for a significantly less electron-accelerating energy.

By way of specific example, if the third harmonic is selected, it is possible to obtain optical output at a wavelength of 0.5 micron using an energy level for a laser of fundamental wavelength of 1.5 micron. The energy required is about 66 MeV as compared with about 117 MeV that would be required if one were to generate the shorter wavelength in a fundamental oscillation mode of the device.

It will be appreciated from the foregoing that the present invention represents a significant advance in the field of free-electron lasers. In particular, the invention provides a technique for producing laser emissions at relatively short wavelengths without using the high energies usually associated with these wavelengths. It will also be appreciated that, although a specific embodiment of the invention has been described in detail for purposes of illustration, various modifications may be made without departing from the spirit and scope of the invention. Accordingly, the invention is not to be limited except as by the appended claims.

We claim:

1. A free-electron laser modified for operation at a shorter wavelength than its fundamental, without a corresponding increase in electron energy, the laser comprising:

a free-electron laser cavity;

means for generating a high-energy beam of electrons, including means for accelerating the electrons in controlled bunches and introducing the electron beam into the laser cavity;

a wiggler magnetic field generator, providing a magnetic field transverse to the electron beam in the laser cavity and varying periodically in field strength along the direction of the beam, to interact with the beam and produce spontaneous emission of light; and opposed optical mirror means, responsive to the fundamental wavelength and to a selected harmonic wavelength;

whereby lasing is initiated at the fundamental wavelength, but is also sustained at the selected harmonic wavelength.

2. A free-electron laser as defined in claim 1, in which:

the selected harmonic wavelength is an harmonic of the fundamental.

3. A free-electron laser as defined in claim 2, in which:

the selected harmonic wavelength is the third harmonic.

4. A free-electron laser as defined in claim 1, in which:

the opposed optical mirror means includes a first pair of mirrors selected to be reflective at the fundamental wavelength, and a second pair of mirrors selected to be reflective at the selected harmonic.

5. A free-electron laser as defined in claim 1 in which:

the opposed optical mirror means includes only a single pair of mirrors, selected to be reflective at both the fundamental wavelength and at the selected harmonic wavelength.

6. A method for enhancing the harmonic gain of a free-electron laser, comprising the steps of:

providing a set of laser optical mirrors reflective at both a selected fundamental wave-length and at a selected harmonic wavelength;

positioning the optical mirrors to define in part a free-electron laser cavity;

initiating lasing at the fundamental wave-length, the initiating step including accelerating a beam of electrons to relativistic energy, introducing the beam into a periodically varying magnetic field transverse to the beam in the laser cavity, and thereby emitting light from the laser cavity at the selected fundamental wavelength, which is dependent on the wavelength of the magnetic field and the energy of the electron beam; and continuing lasing at the selected harmonic wavelength, as a result of harmonic components in electron density variations in the direction of the beam, and as a result of the selection of laser optical mirrors that are also reflective at the harmonic wavelength.

7. A method as defined in claim 6, and further including the step of:

terminating lasing at the fundamental wavelength while continuing lasing at the selected harmonic wavelength.

8. A method as defined in claim 6, in which:

the selected harmonic wavelength corresponds an odd frequency harmonic.

9. A method as defined in claim 8, in which:

the selected harmonic wavelength corresponds to the third harmonic.

* * * * *